(12) United States Patent
Lee et al.

(10) Patent No.: US 12,016,057 B2
(45) Date of Patent: Jun. 18, 2024

(54) METHOD AND DEVICE FOR PERFORMING RANDOM ACCESS PROCEDURE IN WIRELESS COMMUNICATION SYSTEM

(71) Applicant: LG ELECTRONICS INC., Seoul (KR)

(72) Inventors: Jeongsu Lee, Seoul (KR); Hyunsoo Ko, Seoul (KR); Kijun Kim, Seoul (KR); Sukhyon Yoon, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 88 days.

(21) Appl. No.: 17/426,378

(22) PCT Filed: Jan. 31, 2020

(86) PCT No.: PCT/KR2020/001506
§ 371 (c)(1),
(2) Date: Jul. 28, 2021

(87) PCT Pub. No.: WO2020/159294
PCT Pub. Date: Aug. 6, 2020

(65) Prior Publication Data
US 2022/0183076 A1 Jun. 9, 2022

(30) Foreign Application Priority Data

Feb. 1, 2019 (KR) .................. 10-2019-0013815
Aug. 14, 2019 (KR) .................. 10-2019-0099923

(51) Int. Cl.
*H04W 74/08* (2009.01)
*H04W 52/32* (2009.01)
(Continued)

(52) U.S. Cl.
CPC ..... *H04W 74/0841* (2013.01); *H04W 72/0473* (2013.01); *H04W 74/004* (2013.01); *H04W 74/0866* (2013.01)

(58) Field of Classification Search
CPC .............................................. H04W 88/00–06
See application file for complete search history.

(56) References Cited

U.S. PATENT DOCUMENTS

2009/0286566 A1* 11/2009 Lindholm ............ H04W 52/16
455/522
2010/0041428 A1 2/2010 Chen et al.
(Continued)

FOREIGN PATENT DOCUMENTS

| CN | 105453461 | 3/2016 |
|---|---|---|
| CN | 107432042 | 12/2017 |

(Continued)

OTHER PUBLICATIONS

PCT International Search Report in International Appln. No. PCT/KR2020/001506, dated May 13, 2020, 7 pages.
(Continued)

*Primary Examiner* — San Htun
(74) *Attorney, Agent, or Firm* — Fish & Richardson P.C.

(57) ABSTRACT

A method of performing, by a user equipment (UE), a random access procedure in a wireless communication system is disclosed. The method includes receiving configuration information related to the random access procedure, transmitting a random access preamble and a physical uplink shared channel (PUSCH), and receiving a random access response (RAR) message. The PUSCH is transmitted based on a predetermined PUSCH transmission power. The predetermined PUSCH transmission power is based on preamble reception power information related to a transmission of the random access preamble and a specific offset.

4 Claims, 12 Drawing Sheets

(51) Int. Cl.
*H04W 72/044* (2023.01)
*H04W 74/00* (2009.01)
*H04W 74/0833* (2024.01)

(56) References Cited

U.S. PATENT DOCUMENTS

| | | | | |
|---|---|---|---|---|
| 2010/0074130 | A1* | 3/2010 | Bertrand | H04L 27/2692 370/252 |
| 2013/0058315 | A1* | 3/2013 | Feuersanger | H04W 52/346 370/336 |
| 2015/0078188 | A1* | 3/2015 | Xu | H04W 52/367 370/252 |
| 2017/0019932 | A1* | 1/2017 | Su | H04J 11/00 |
| 2017/0339591 | A1 | 11/2017 | Li et al. | |
| 2018/0279376 | A1* | 9/2018 | Dinan | H04W 52/50 |
| 2018/0324716 | A1 | 11/2018 | Jeon et al. | |
| 2018/0324853 | A1 | 11/2018 | Jeon et al. | |
| 2019/0166628 | A1* | 5/2019 | Kim | H04W 72/0446 |

FOREIGN PATENT DOCUMENTS

| | | |
|---|---|---|
| KR | 10-2011-0036064 | 4/2011 |
| KR | 10-2012-0096411 | 8/2012 |
| KR | 10-2013-0053635 | 5/2013 |
| KR | 10-1874276 | 6/2018 |

OTHER PUBLICATIONS

3GPP, "3rd Generation Partnership Project; Technical Specification Group Radio Access Network; NR; Medium Access Control (MAC) protocol specification (Release 15)," TS 38.321 V15.4.0, Dec. 2018, 77 pages.
Perez, "Uplink Physical Channels," LTE and LTE Advanced : 4G Network Radio Interface, Nov. 2015, 257-301.
Dahlman et al., "Random Access," 5G NR: The Next Generation Wireless Access Technology, Aug. 2018, 349-370, 1st Edition: Aug. 31, 2018.
Extended European Search Report in European Appln. No. 20748305.8, dated Feb. 3, 2022, 13 pages.
Nokia et al., "Correction to BFR procedure," R2-1817602, Presented at 3GPP TSG-RAN WG2 Meeting #104, Spokane, USA, Nov. 12-16, 2018, 6 pages.
Qualcomm Incorporated, "Channel Structure for Two-Step RACH," R1-1902977, Presented at 3GPP TSG-RAN WG1 Meeting #96, Feb. 25-Mar. 1, 2019, Athens, Greece, 10 pages.
Office Action in Chinese Appln. No. 202080011866.6, mailed on Jun. 29, 2023, 16 pages (with English translation).

* cited by examiner

[FIG. 1]
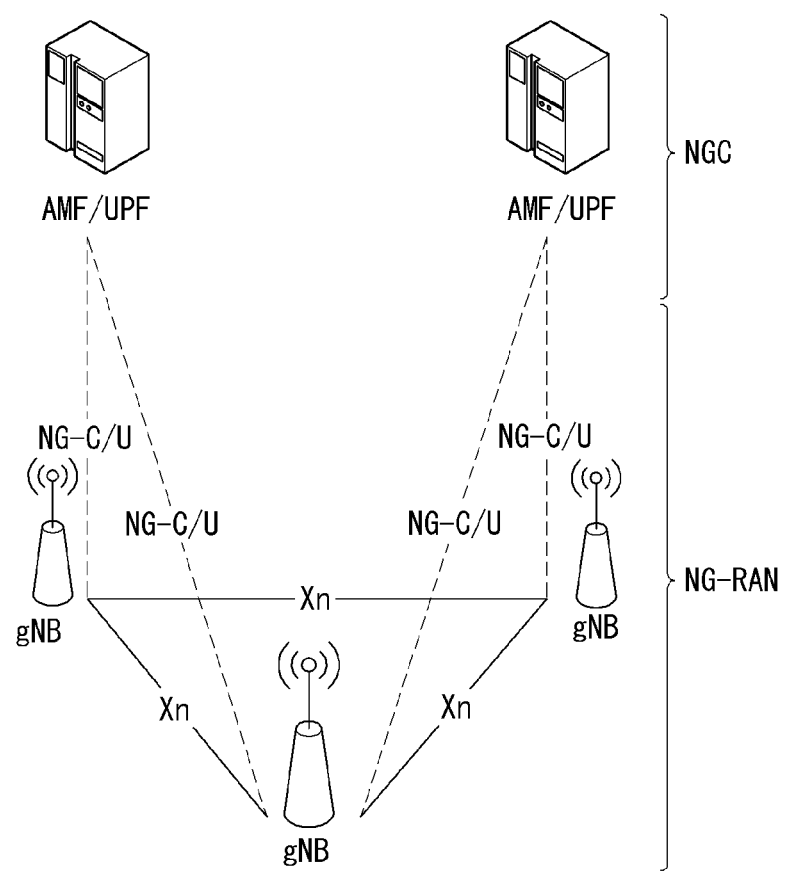

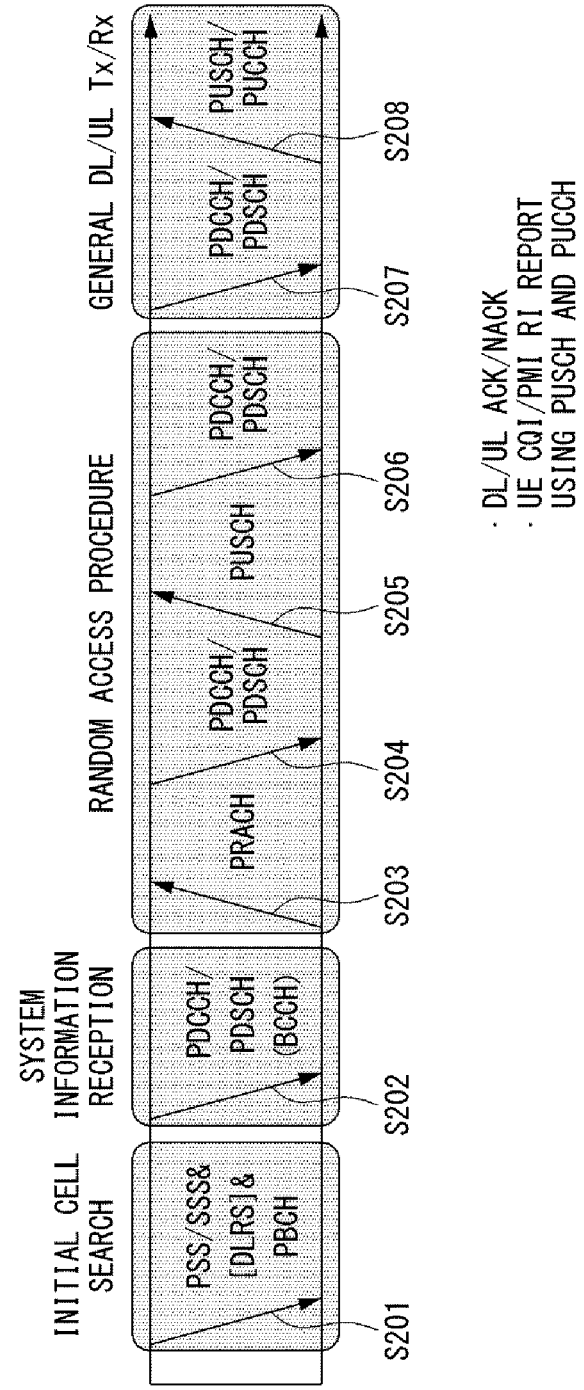
[FIG. 2]

[FIG. 3]
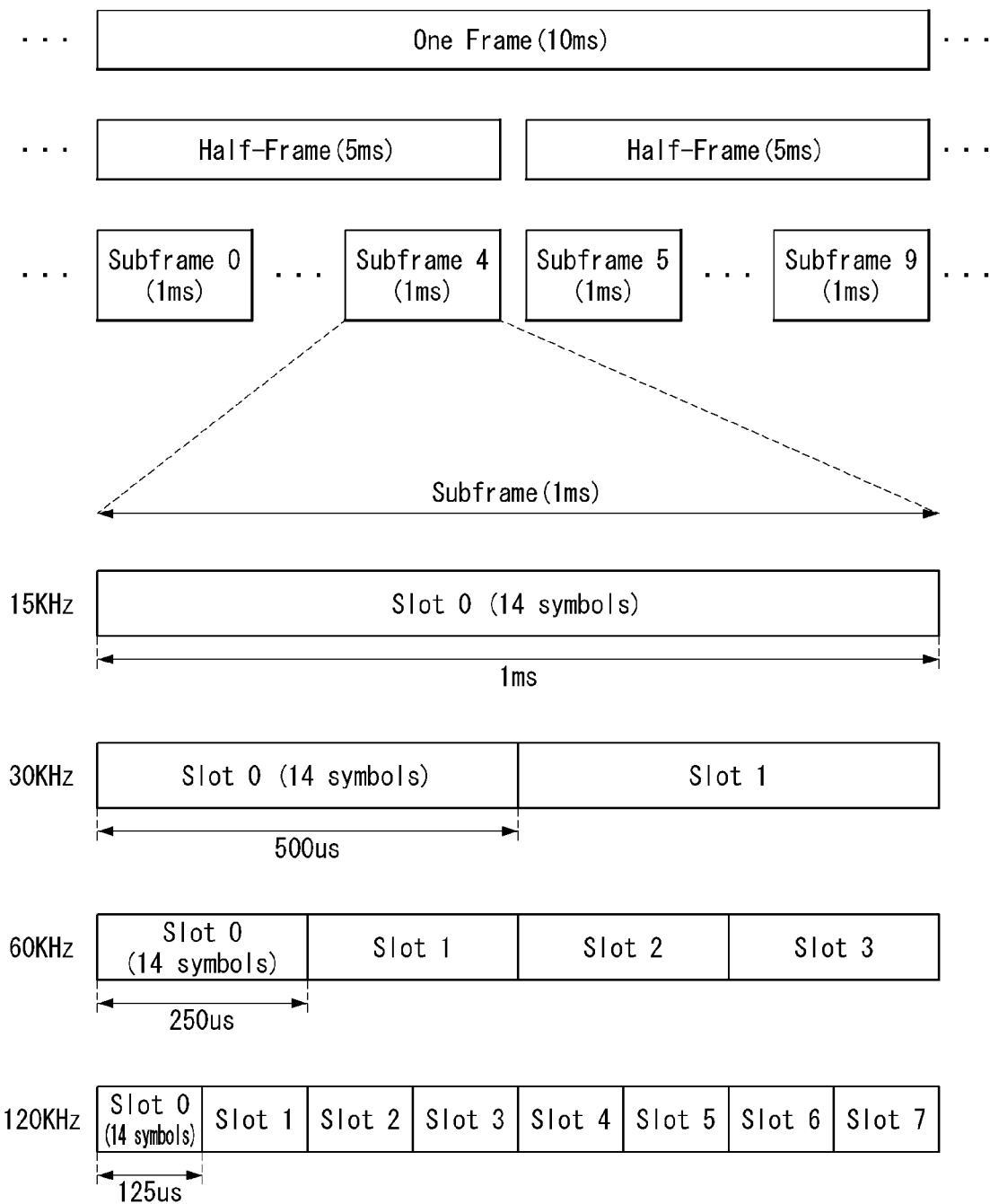

[FIG. 4]
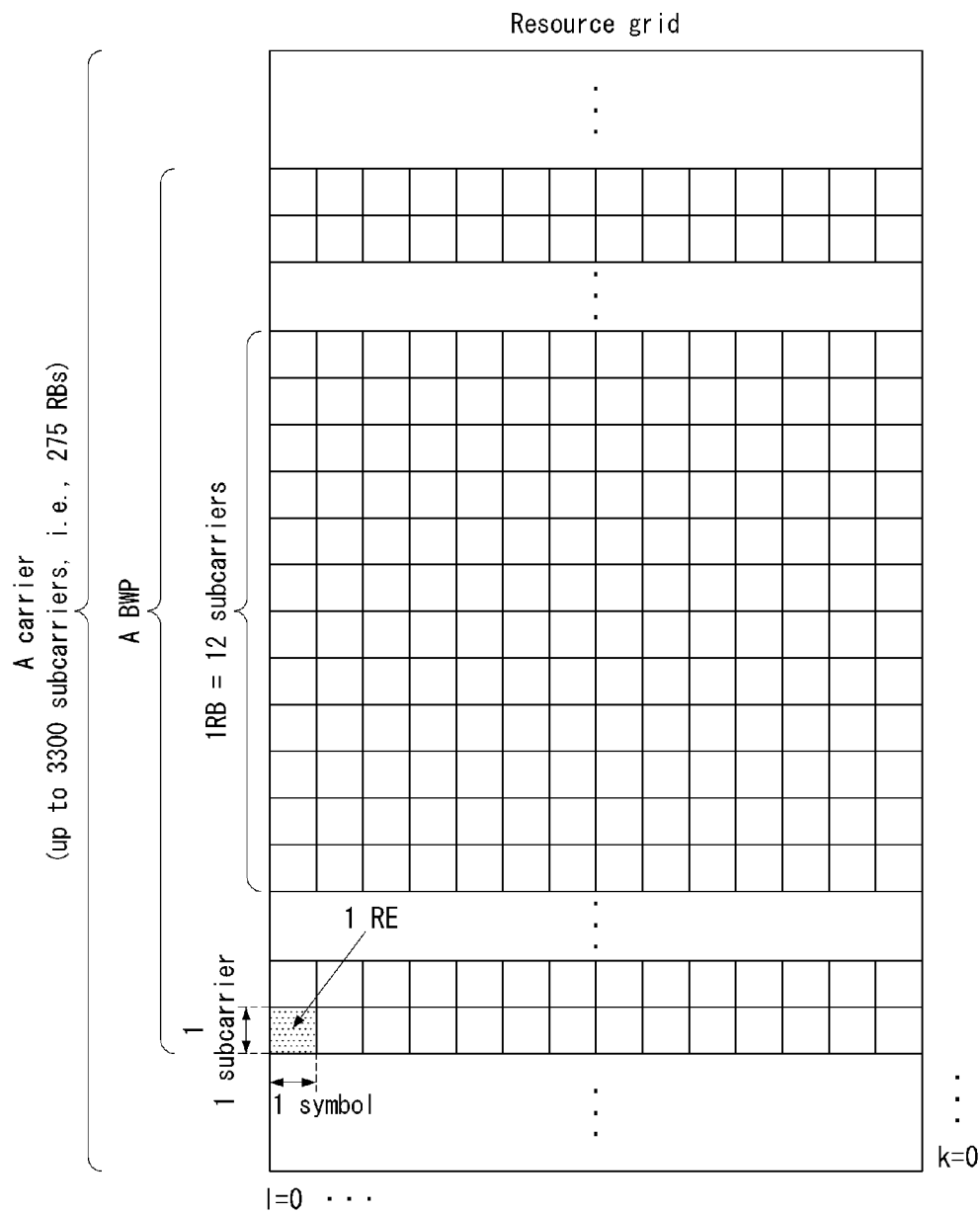

[FIG. 5]
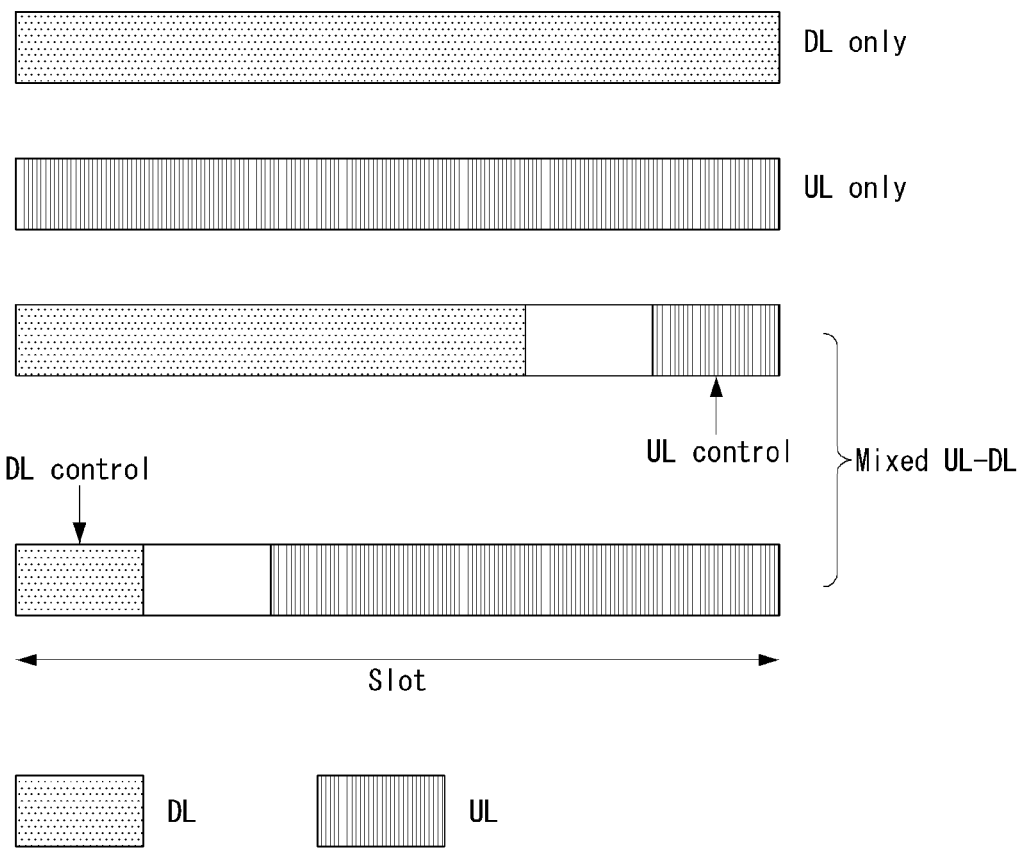

[ FIG. 6 ]
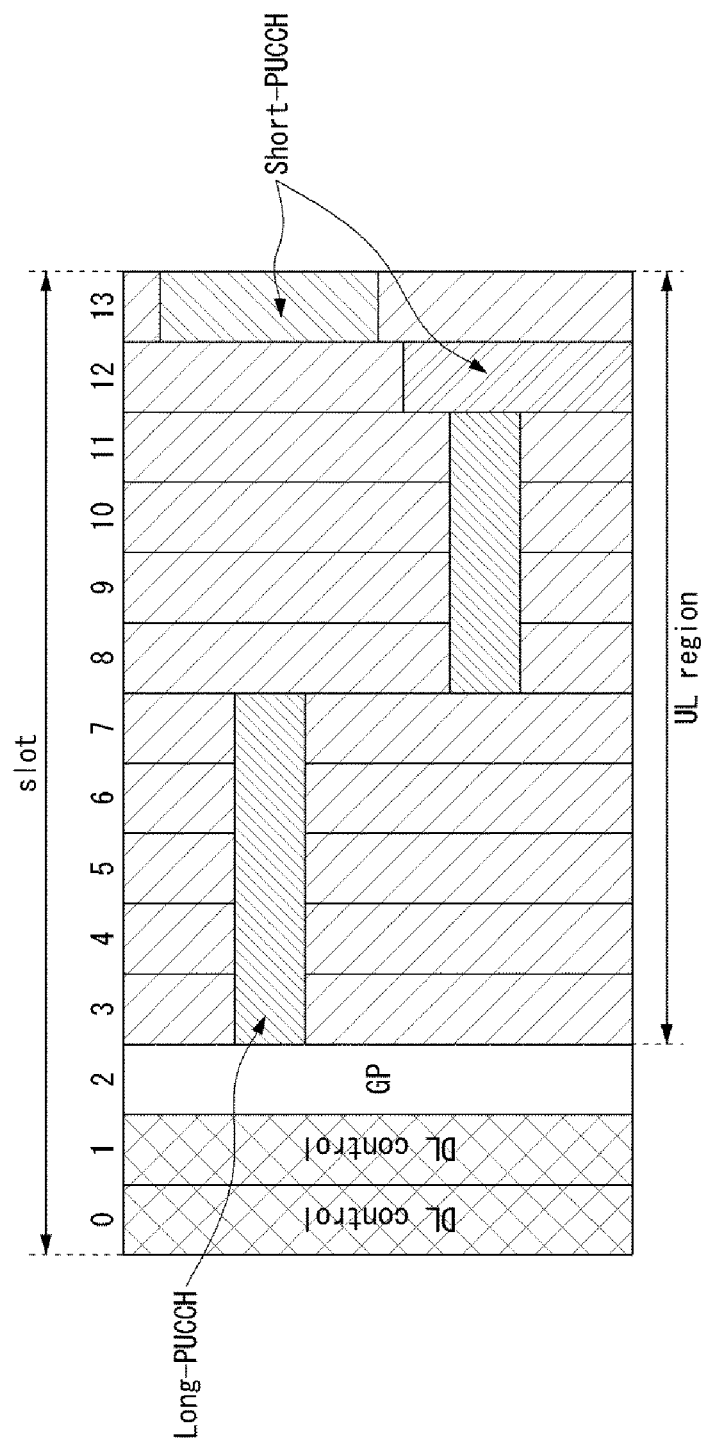

[FIG. 7]
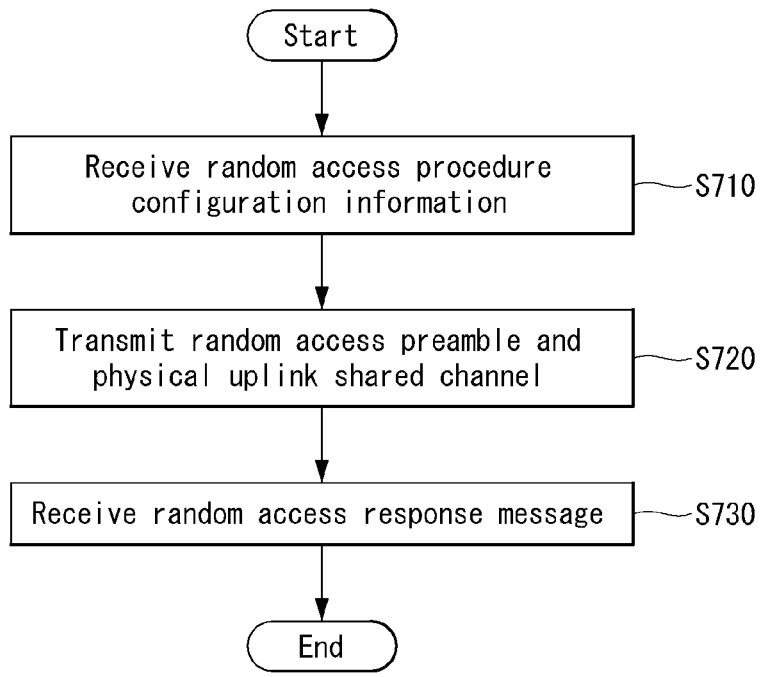
[FIG. 8]
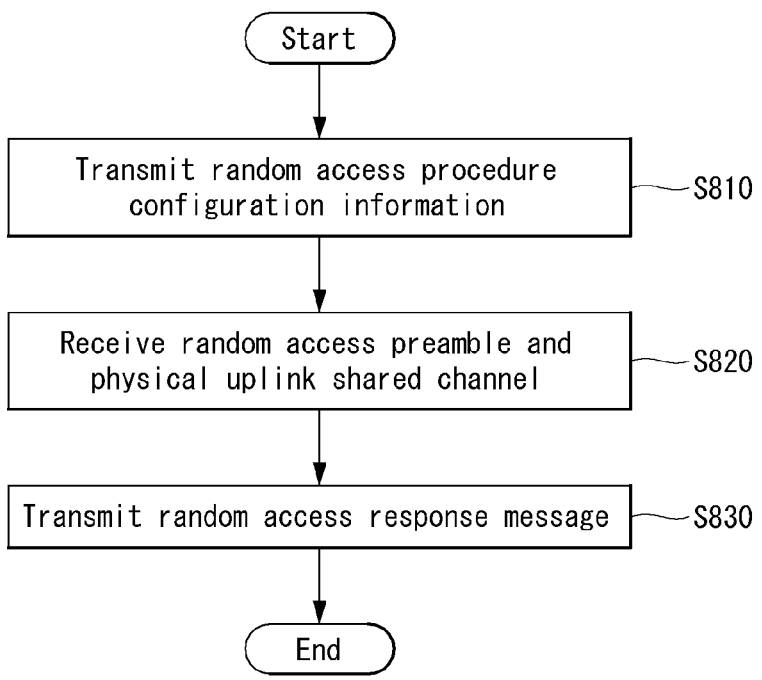

[FIG. 9]
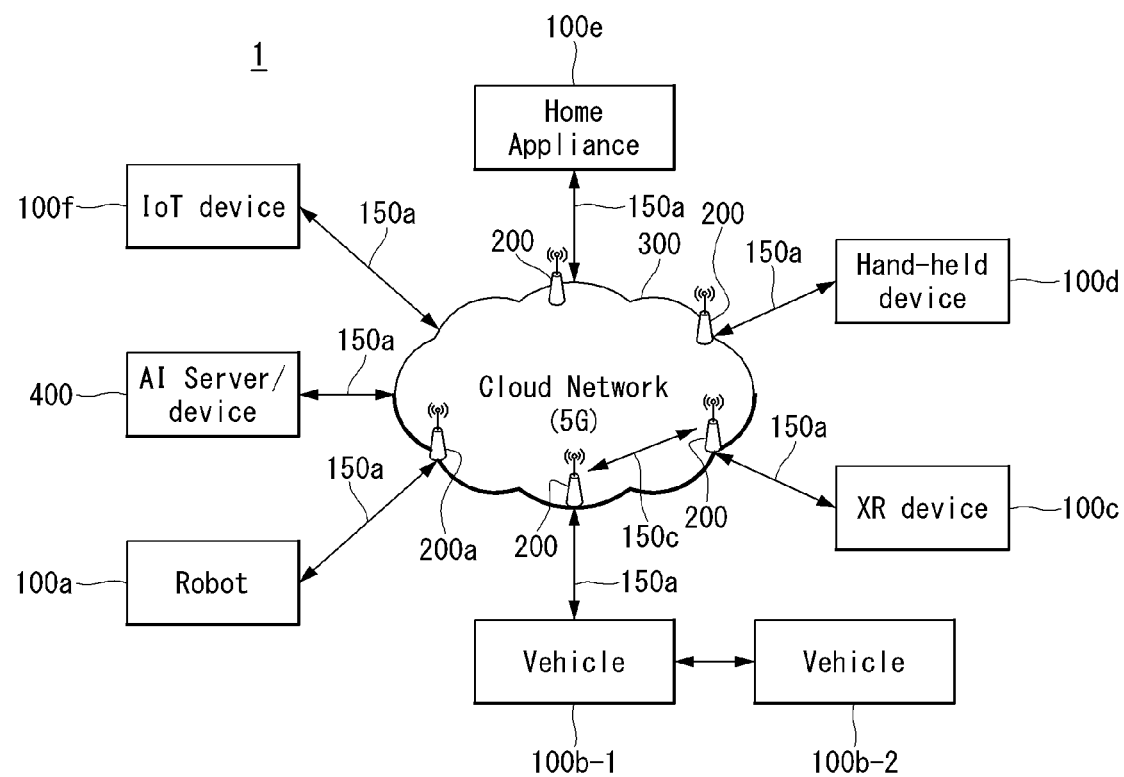

[FIG. 10]
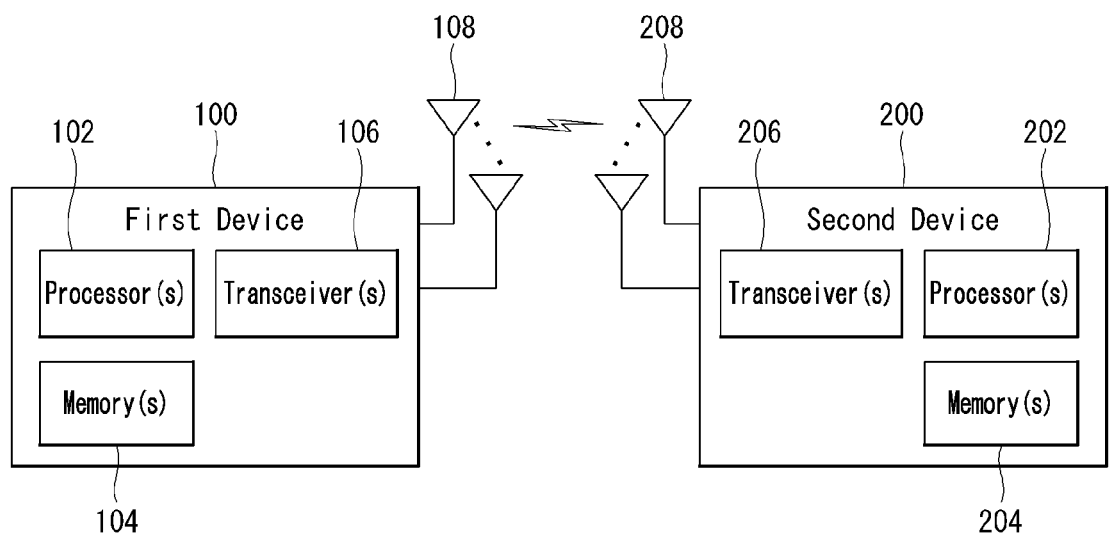

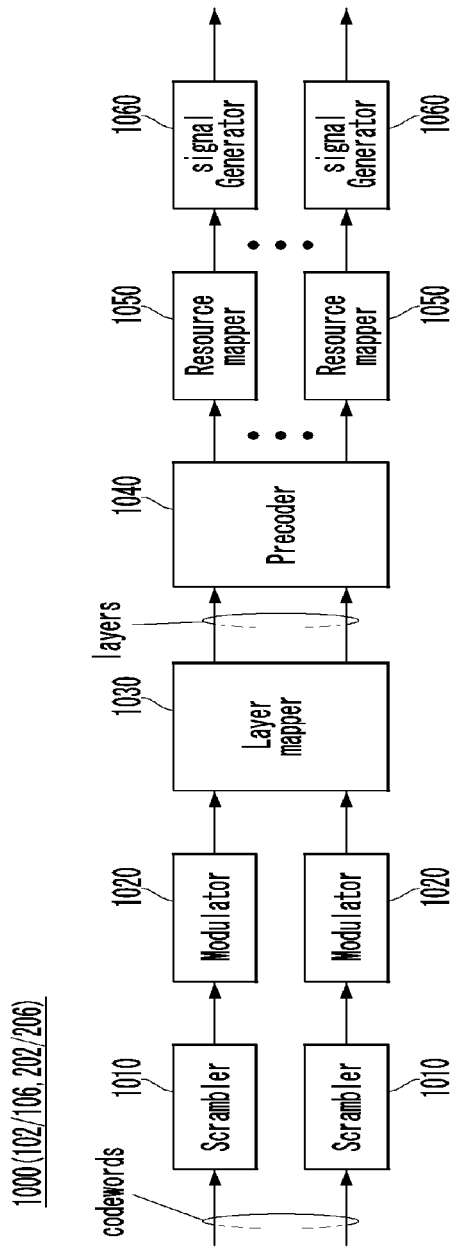
[FIG. 11]

[FIG. 12]
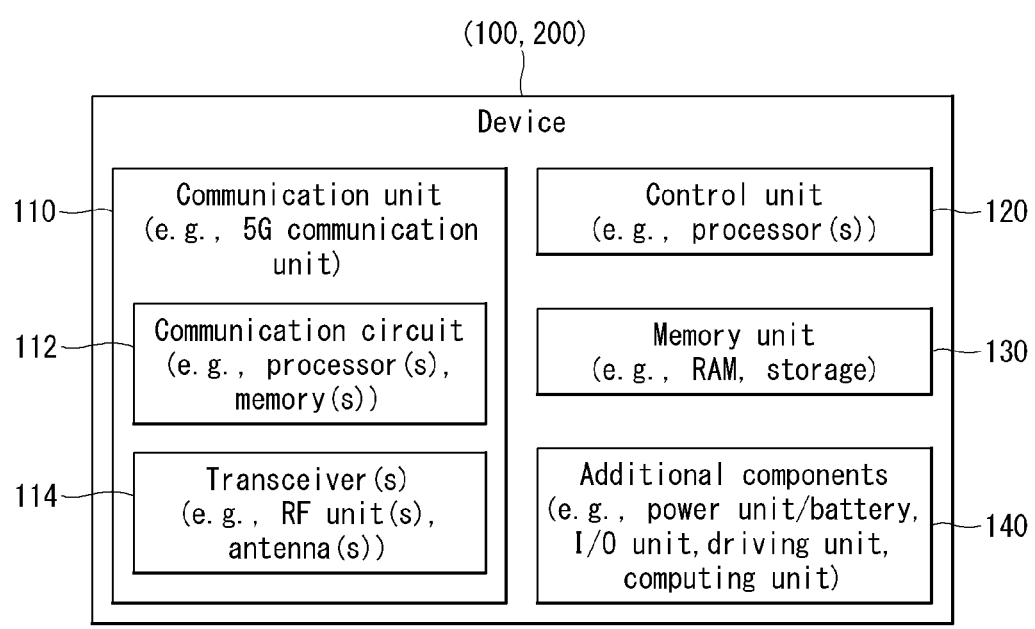

[FIG. 13]
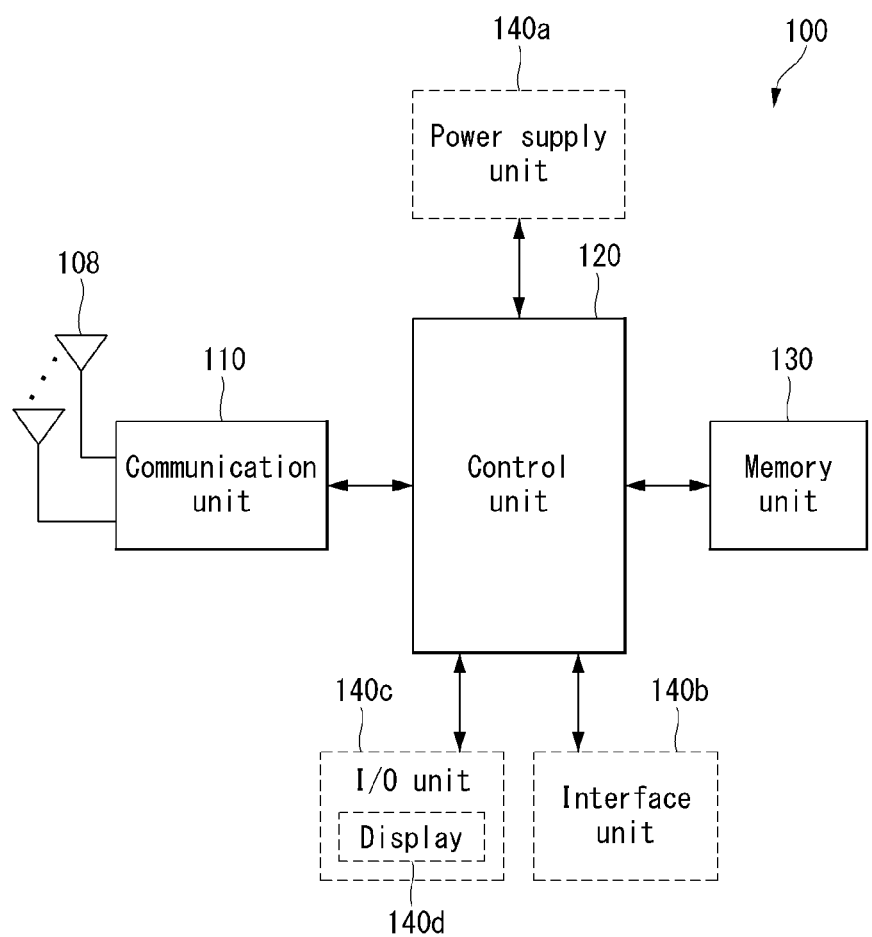

METHOD AND DEVICE FOR PERFORMING RANDOM ACCESS PROCEDURE IN WIRELESS COMMUNICATION SYSTEM

CROSS-REFERENCE TO RELATED APPLICATIONS

This application is the National Stage filing under 35 U.S.C. 371 of International Application No. PCT/KR2020/001506, filed on Jan. 31, 2020, which claims the benefit of KR Application No. 10-2019-0013815, filed on Feb. 1, 2019, No. 10-2019-0099923, filed on Aug. 14, 2019, the contents of which are all hereby incorporated by reference herein in their entirety.

TECHNICAL FIELD

The present disclosure relates to a method and device for performing a random access procedure in a wireless communication system.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DISCLOSURE

Technical Problem

The present disclosure provides a method for performing a 2-step random access procedure.

More specifically, in the 2-step random access procedure, a random access preamble and a physical uplink shared channel (PUSCH) are transmitted together (MsgA). Thus, if a base station fails to decode even one of the random access preamble or the PUSCH, a UE shall transmit again both the random access preamble and the PUSCH. Hence, resources required to perform a random access procedure increase, and a latency occurs.

An object of the present disclosure is to solve the above-described problem.

The technical problems to be solved by the present disclosure are not limited by the above-mentioned technical problems, and other technical problems which are not mentioned above can be clearly understood from the following description by those skilled in the art to which the present disclosure pertains.

Technical Solution

In one aspect of the present disclosure, there is provided a method of performing, by a user equipment (UE), a random access procedure in a wireless communication system, the method comprising receiving configuration information related to the random access procedure, transmitting a random access preamble and a physical uplink shared channel (PUSCH), and receiving a random access response (RAR) message.

The PUSCH is transmitted based on a predetermined PUSCH transmission power, and the predetermined PUSCH transmission power is based on preamble reception power information related to a transmission of the random access preamble and a specific offset.

The specific offset may be related to the preamble reception power information.

The predetermined PUSCH transmission power may be determined as a smaller value of i) a pre-configured UE transmission power and ii) a value calculated based on the preamble reception power information and the specific offset.

The configuration information may include the preamble reception power information.

The random access preamble may be transmitted based on a predetermined preamble transmission power.

The predetermined preamble transmission power may be based on i) the preamble reception power information and ii) an offset for the preamble transmission power.

The offset for the preamble transmission power may be based on a data size related to the PUSCH.

The offset for the preamble transmission power may be based on an event related to an initiation of the random access procedure.

The event may include at least one of a handover or a beam failure recovery.

The offset for the preamble transmission power may be related to an index of the random access preamble. The index of the random access preamble may be one of a plurality of preamble indexes mapped to the offset for the preamble transmission power.

In another aspect, there is provided a user equipment (UE) performing a random access procedure in a wireless communication system, the UE comprising one or more transceivers, one or more processors, and one or more memories operationally connected to the one or more processors, wherein when the random access procedure is performed by the one or more processors, the one or more memories store instructions that allow operations to be performed.

The operations comprises receiving configuration information related to the random access procedure, transmitting a random access preamble and a physical uplink shared channel (PUSCH), and receiving a random access response (RAR) message.

The PUSCH is transmitted based on a predetermined PUSCH transmission power, and the predetermined PUSCH transmission power is based on preamble reception power information related to a transmission of the random access preamble and a specific offset.

In another aspect, there is provided a device comprising one or more memories and one or more processors operationally connected to the one or more memories.

The one or more processors are configured to allow the device to receive configuration information related to a random access procedure, transmit a random access preamble and a physical uplink shared channel (PUSCH), and receive a random access response (RAR) message.

The PUSCH is transmitted based on a predetermined PUSCH transmission power, and the predetermined PUSCH transmission power is based on preamble reception power information related to a transmission of the random access preamble and a specific offset.

In another aspect, there is provided a method of performing, by a base station, a random access procedure in a wireless communication system, the method comprising transmitting configuration information related to the random access procedure, receiving a random access preamble and a physical uplink shared channel (PUSCH), and transmitting a random access response (RAR) message.

The PUSCH is transmitted based on a predetermined PUSCH transmission power, and the predetermined PUSCH transmission power is based on preamble reception power information related to a transmission of the random access preamble and a specific offset.

In another aspect, there is provided a base station performing a random access procedure in a wireless communication system, the base station comprising one or more transceivers, one or more processors, and one or more memories operationally connected to the one or more processors, wherein when the random access procedure is performed by the one or more processors, the one or more memories store instructions that allow operations to be performed.

The operations comprises transmitting configuration information related to the random access procedure, receiving a random access preamble and a physical uplink shared channel (PUSCH), and transmitting a random access response (RAR) message.

The PUSCH is transmitted based on a predetermined PUSCH transmission power, and the predetermined PUSCH transmission power is based on preamble reception power information related to a transmission of the random access preamble and a specific offset.

In another aspect, there is provided one or more non-transitory computer readable media storing one or more commands.

The one or more commands executable by one or more processors is configured to allow a user equipment to receive configuration information related to the random access procedure, transmit a random access preamble and a physical uplink shared channel (PUSCH), and receive a random access response (RAR) message.

The PUSCH is transmitted based on a predetermined PUSCH transmission power, and the predetermined PUSCH transmission power is based on preamble reception power information related to a transmission of the random access preamble and a specific offset.

Advantageous Effects

According to an embodiment of the present disclosure, in a 2-step random access procedure, a UE transmits a physical uplink shared channel (PUSCH) based on a predetermined PUSCH transmission power. The predetermined PUSCH transmission power is based on preamble reception power information and a specific offset related to transmission of a random access preamble. Thus, the decoding of the random access preamble has been completed, but the probability of retransmission of the preamble and the PUSCH (i.e., MsgA) caused by a failure of the decoding of the PUSCH is reduced, and resources required in the random access procedure are reduced.

According to an embodiment of the present disclosure, a random access preamble is transmitted based on higher power than Msg1 of a 4-step RACH. Specifically, the random access preamble is transmitted based on a predetermined preamble transmission power. The preamble transmission power is based on i) preamble reception power information and ii) an offset for the preamble transmission power.

As described above, a random access preamble of the message A (MsgA) may be transmitted based on high power than Msg1 of a 4-step random access procedure. In other words, since a decoding failure of the random access preamble causes the retransmission of the PUSCH, the 2-step random access procedure may be performed to have a priority over the 4-step random access procedure.

According to an embodiment of the present disclosure, the offset for the preamble transmission power is based on a data size related to the PUSCH or an event related to an initiation of the random access procedure. Thus, the corresponding random access procedure may be performed depending on an importance or an urgency of the random access procedure. Specifically, the random access procedure initiated for handover or beam failure recovery or the random access procedure when a size of data to be transmitted is large may be performed to have a priority over a 2-step random access procedure of another UE.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and serve to explain technical features of the present disclosure together with the description.

FIG. 1 illustrates an example of an overall system structure of NR to which a method described in the present disclosure is applicable.

FIG. 2 illustrates physical channels and normal signal transmission used in a wireless communication system to which a method described in the present disclosure is applicable.

FIG. 3 illustrates a structure of a radio frame used in NR to which a method described in the present disclosure is applicable.

FIG. 4 illustrates a slot structure of an NR frame to which a method described in the present disclosure is applicable.

FIG. 5 illustrates a structure of a self-contained slot to which a method described in the present disclosure is applicable.

FIG. 6 illustrates configuration in which a short PUCCH and a long PUCCH to which a method described in the present disclosure is applicable are multiplexed with an uplink signal.

FIG. 7 is a flow chart illustrating a method for a UE to perform a random access procedure in a wireless communication system according to an embodiment of the present disclosure.

FIG. 8 is a flow chart illustrating a method for a base station to perform a random access procedure in a wireless communication system according to another embodiment of the present disclosure.

FIG. 9 illustrates a communication system 1 applied to the present disclosure.

FIG. 10 illustrates a wireless device applicable to the present disclosure.

FIG. 11 illustrates a signal processing circuit applied to the present disclosure.

FIG. 12 illustrates another example of a wireless device applied to the present disclosure.

FIG. 13 illustrates a portable device applied to the present disclosure.

MODE FOR INVENTION

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the present disclosure is described based on the 3GPP communication system (e.g., LTE-A or NR), but the technical spirit of the present disclosure is not limited thereto. LTE refers to technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in the standard documents published before the present disclosure may refer to background arts, terms, abbreviations, etc., used for describing the present disclosure. For example, the following documents may be referenced.

3GPP LTE
- 36.211: Physical channels and modulation
- 36.212: Multiplexing and channel coding
- 36.213: Physical layer procedures
- 36.300: Overall description
- 36.331: Radio Resource Control (RRC)

3GPP NR
- 38.211: Physical channels and modulation
- 38.212: Multiplexing and channel coding
- 38.213: Physical layer procedures for control
- 38.214: Physical layer procedures for data
- 38.300: NR and NG-RAN Overall Description
- 36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

Three major requirement areas of 5G include (1) an enhanced mobile broadband (eMBB) area, (2) a massive machine type communication (mMTC) area, and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies can be defined.

DEFINITION OF TERMS eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.
Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.
The gNBs are connected to the NGC via the NG interface.
More specifically, the gNB connects to the access and mobility management function (AMF) via the N2 interface and connects to the user plane function (UPF) via the N3 interface.
New RAT (NR) Numerology and Frame Structure In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, μ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | Δf = $2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

With regard to the frame structure in the NR system, the size of various fields in the time domain is expressed as a multiple of time unit of $T_s=1/(\Delta f_{max} \cdot N_f)$, where $\Delta f_{max}=480 \cdot 10^3$ and $N_f=4096$ Downlink and uplink transmissions is constituted of a radio frame with a period of $T_f=(\Delta f_{max} N_f/100) \cdot T_s=10$ ms. Here, the radio frame is constituted of 10 subframes each of which has a period of $T_{sf}=(\Delta f_{max} N_f/1000) \cdot T_s$. In this case, one set of frames for uplink and one set of frames for downlink may exist.
Physical Channel and General Signal Transmission FIG. 2 illustrates physical channels and normal signal transmission used in a wireless communication system to which a method described in the present disclosure is applicable.

In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S201). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S202).

Meanwhile, when there is no radio resource first accessing the eNB or for signal transmission, the UE may perform a Random Access Procedure (RACH) to the eNB (S203 to S206). To this end, the UE may transmit a specific sequence to a preamble through a Physical Random Access Channel (PRACH) (S203 and S205) and receive a response message (Random Access Response (RAR) message) for the preamble through the PDCCH and a corresponding PDSCH. In the case of a contention based. RACH, a Contention Resolution Procedure may be additionally performed (S206).

The UE that performs the above procedure may then perform PDCCH/PDSCH reception (S207) and Physical Uplink Shared Channel (PUSCH)/Physical Uplink Control Channel (PUCCH) transmission (S208) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Aerial Communication in LTE System
Performance Requirement

The following Table 3 illustrates connectivity service requirements for aerial vehicles in LTE system.

TABLE 3

| Items | Value |
|---|---|
| Data type | 1. C&C: This includes telemetry, waypoint update for autonomous UAV operation, real time piloting, identity, flight authorization, navigation database update, etc.<br>2. Application Data: This includes video (streaming), images, other sensor data, etc. |
| Latency | 1. C&C: 50 ms (one way from eNB to UAV)<br>2. Application Data: similar to LTE UE (terrestrial user) |
| DL/UL data rate | 1. C&C: 60-100 kbps for UL/DL<br>2. Application Data: up to 50 Mbps for UL |
| C&C Reliability | Up to $10^{-3}$ Packet Error Loss Rate |

Potential Power Control Enhancements for Unlink Interference Mitigation in Aerial
UE Specific Fractional Path Loss Compensation Factor In this solution, an enhancement to the existing open loop power control mechanism is considered where a UE specific fractional path loss compensation factor is introduced. With the introduction of UE specific fractional path loss compensation factor, it is possible to configure the aerial UEs with a different compared to the fractional path loss compensation factor configured to the terrestrial UEs. This solution requires standard enhancement to the existing open loop power control mechanism in order to introduce the possibility to configure a fractional path loss compensation factor in a UE specific manner.

UE Specific P0 Parameter

In this solution, when UE specific P0 is compared to the P0 configured to the terrestrial UEs, since UE specific P0 is already supported in the existing open loop power control mechanism, enhancements to the existing power control mechanism are not needed.

Closed Loop Power Control

In this solution, the target received powers for the aerial UEs are adjusted taking into account both serving and neighbour cell measurement reports. In this solution, the closed loop power control for aerial UEs also needs to cope with potential fast signal change in the sky since aerial UEs may be served by the sidelobes of base station antennas. Hence, this solution may require specification enhancements for increased step size of $\delta_{PUSCH,c}$.

FIG. 3 illustrates a structure of a radio frame used in NR to which a method described in the present disclosure is applicable.

In NR, uplink and downlink transmission is configured by the frame. The radio frame has a length of 10 ms and is defined as two 5 ms half-frames (HFs). The half-frame is defined as 5 1 ms subframes (SFs). The subframe is split into one or more slits and the number of slots in the subframe depends on the subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbol may include an OFDM symbol (or CP-OFDM symbol) and an SC-FDMA symbol (or DFT-s-OFDM symbol).

Table 4 below shows that when the normal CP is used, the number of symbols for each slot, the number of slots for each frame, and the number of slots for each subframe vary according to the SCS.

Table 4

| SCS ($15 * 2^\wedge U$) | $N_{symb}^{slot}$ | $N_{slot}^{frame,u}$ | $N_{slot}^{subframe,u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

$N^{slot}_{symb}$: the number of symbols in slot
$N^{frame,u}_{slot}$: the number of slots in frame
$N^{subframe,u}_{slot}$: the number of slots in subframe Table 5 below shows that when the extended CP is used, the number of symbols for each slot, the number of slots for each frame, and the number of slots for each subframe vary according to the SCS.

TABLE 5

| SCS ($15 * 2^\wedge U$) | $N_{symb}^{slot}$ | $N_{slot}^{frame,u}$ | $N_{slot}^{subframe,u}$ |
|---|---|---|---|
| 60 KHz (u = 2) | 12 | 40 | 4 |

In the NR system, OFDM(A) numerology (e.g., SCS, CP length, etc.) may be differently set between a plurality of cells merged into one UE. As a result, an (absolute time) section of the time resource (e.g., SF, slot or TTI) (for convenience, collectively referred to as Time Unit (TU)) constituted by the same number of symbols may be configured differently between the merged cells.

FIG. 4 illustrates a slot structure of an NR frame to which a method described in the present disclosure is applicable.

The slot includes a plurality of symbols in the time domain. For example, in the case of the normal CP, one slot includes 7 symbols, but in the case of the extended CP, one slot includes 6 symbols. A carrier includes a plurality of subcarriers in the frequency domain. The resource block (RB) is defined as a plurality of (e.g., 12) consecutive subcarriers in the frequency domain. A bandwidth part (BWP) may be defined as a plurality of consecutive (P)RBs in the frequency domain and may correspond to one numerology (e.g., SCS, CP length, etc.). The carrier may include a maximum of N (e.g., 5) BWPs. Data communication may be performed through an activated BWP, and only one BWP may be activated in one UE. In a resource grid, each element is referred to as a resource element (RE) and one complex symbol may be mapped.

FIG. 5 illustrates a structure of a self-contained slot to which a method described in the present disclosure is applicable.

In the NR system, a frame is characterized by a self-complete structure in which all of a DL control channel, DL or UL data, and UL control channel may be included in one slot. For example, first N symbols in the slot may be used to transmit a DL control channel (hereinafter, referred to as a DL control region), and last M symbols in the slot may be used to transmit a UL control channel (hereinafter, a UL control region). N and M are each an integer of 0 or more. A resource region (hereinafter, referred to as the data region) between the DL control region and the UL control region may be used for DL data transmission or UL data transmission. As an example, the following configuration may be considered. Each period is listed in chronological order.

1. DL only configuration
2. UL only configuration
3. Mixed UL-DL configuration
    DL region+Guard Period (GP)+UL control region
    DL control region+Guard Period (GP)+UL control region
        DL region: (i) DL data region, (ii) DL control region+DL data region
        UL region: (i) DL data region, (ii) DL data region+DL control region The PDCCH may be transmitted in the DL control region, and the PDSCH may be transmitted in the DL data region. The PUCCH may be transmitted in the UL control region, and the PUSCH may be transmitted in the UL data region. In the PDCCH, downlink control information (DCI), e.g., DL data scheduling information, UL data scheduling information, etc., may be transmitted. In PUCCH, uplink control information (UCI), e.g., Positive Acknowledgement/Negative Acknowledgement (ACK/NACK) information, Channel State Information (CSI) information, Scheduling Request (SR), etc., for DL data may be transmitted. The GP provides a time gap in the process of switching the BS and the UE from the transmission mode to the reception mode or the process of switching from the reception mode to the transmission mode. Some symbols at a switching timing from DL to UL may be configured as GP.

Structure of uplink channels is described below.

A UE transmits a related signal to a base station on an uplink channel to be described later, and the base station receives a related signal from the UE on an uplink channel to be described later.

Physical Uplink Shared Channel (PUSCH)

The PUSCH carries uplink data (e.g., UL-shared channel transport block, UL-SCH TB) and/or uplink control information (UCI), and is transmitted based on a cyclic prefix-orthogonal frequency division multiplexing (CP-OFDM) waveform or a discrete Fourier transform-spread-orthogonal frequency division multiplexing (DFT-s-OFDM) waveform. When the PUSCH is transmitted based on the DFT-s-OFDM waveform, the UE transmits the PUSCH by applying transform precoding. For example, if the transform precoding is impossible (e.g., transform precoding is disabled), the UE may transmit the PUSCH based on the CP-OFDM waveform. If the transform precoding is possible (e.g., transform precoding is enabled), the UE may transmit the PUSCH based on the CP-OFDM waveform or the DFT-s-OFDM waveform.

The PUSCH transmission may be dynamically scheduled by a UL grant within downlink control information (DCI), or may be semi-statically scheduled based on higher layer (e.g., RRC) signaling (and/or Layer 1 (L1) signaling (e.g., PDCCH)) (configured grant). The PUSCH transmission may be performed based on a codebook or a non-codebook.

Power Control for PUSCH

The setting of the UE transmit power for physical uplink shared channel (PUSCH) transmission is defined as follows.

If the UE transmits PUSCH without a simultaneous PUCCH for the serving cell c, then the UE transmit power $P_{PUSCH,c}(i)$ for PUSCH transmission in subframe/slot/subslot i for the serving cell c is defined as follows.

$$P_{PUSCH,c}(i) = \min \left\{ \begin{array}{l} P_{CMAX,c}(i), \\ 10\log_{10}(M_{PUSCH,c}(i)) + P_{O\_PUSCH,c}(j) + \alpha_c(j) \cdot pL_c + \Delta_{TF,c}(i) + f_c(i) \end{array} \right\}$$

$$[dBm]$$

If the UE transmits PUSCH simultaneous with PUCCH for the serving cell c, then the UE transmit power $P_{PUSCH,c}(i)$ for the PUSCH transmission in subframe/slot/subslot i for the serving cell c is defined as follows.

$$P_{PUSCH,c}(i) = \min \left\{ \begin{array}{l} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\}$$

$$[dBm]]$$

If the UE is not transmitting PUSCH for the serving cell c, for the accumulation of TPC command received with DCI format 3/3A for PUSCH, the UE assumes that the UE transmit power $P_{PUSCH,c}(i)$ for the PUSCH transmission in subframe i for the serving cell c is computed as follows.

$$P_{PUSCH,c}(i) = \min\{P_{CMAX,c}(i), P_{O\_PUSCH,c}(1) + \alpha_c(1) \cdot PL_c + f_c(i)\}[dBm]$$

Where, $PC_{MAX,c}(t)$ is the configured UE transmit power defined in subframe/slot/subslot i for serving cell c, and $\hat{P}_{CMAX,c}(i)$ is the linear value of $P_{CMAX,c}(i)$. If the UE transmits PUCCH without PUSCH in subframe i for the serving cell c, for the accumulation of TPC command received with DCI format 3/3A for PUSCH, the UE shall assume $P_{CMAX,c}(i)$. If the UE does not transmit PUCCH and PUSCH in subframe i for the serving cell c, for the accumulation of TPC command received with DCI format 3/3A for PUSCH, the UE shall compute $P_{CMAX,c}(i)$ assuming maximum power reduction (MPR)=0 dB, additional-maximum power reduction (A-MPR)=0 dB, power management for MPR (P-MPR)=0 dB, and $\Delta TC=0$ dB, where MPR, A-MPR, P-MPR.

If the UE is a bandwidth reduced low complexity (BL)/coverage enhancement (CE) UE configured with higher layer parameter ce-PUSCH-SubPRB-Config-r15, and the PUSCH resource assignment valid for subframe i and serving cell c is using uplink resource allocation type 5, $M_{PUSCH,c}(i)$ is the bandwidth of the PUSCH resource assignment expressed in fraction of a resource block and is given by $M_{PUSCH,c}(i)=(M_{sc}^{RU}+Q_m-2)/N_{sc}^{RB}$. Otherwise, $M_{PUSCH,c}(i)$ is the bandwidth of the PUSCH resource assignment expressed in number of resource blocks valid for subframe/slot/subslot i and serving cell c.

If the UE is configured with higher layer parameter UplinkPowerControlDedicated-v12x0 for serving cell c and if subframe i belongs to uplink power control subframe set 2 as indicated by the higher layer parameter tpc-Subframe-Set-r12, when j=0, $P_{O\_PUSCH,c}(0)=P_{O\_UE\_PUSCH,c,2}(0)+P_{O\_NOMINAL\_PUSCH,c,2}(0)$, where j=0 is used for PUSCH (re)transmissions corresponding to a semi-persistent grant. $P_{O\_UE\_PUSCH,c,2}(0)$ and $P_{O\_NOMINAL\_PUSCH,c,2}(0)$ are the parameters p0-UE-PUSCH-Persistent-SubframeSet2-r12 and p0-NominalPUSCH-Persistent-SubframeSet2-r12 respectively provided by higher layers, for each serving cell c.

when j=1, $P_{O\_PUSCH,c}(1)=P_{O\_UE\_PUSCH,c,2}(1)+P_{O\_NOMINAL\_PUSCH,c,2}(1)$, where j=1 is used for PUSCH (re)transmissions corresponding to a dynamic scheduled grant. $P_{O\_UE\_PUSCH,c,2}(1)$ and $P_{O\_NOMINAL\_PUSCH,c,2}(1)$ are the parameters p0-UE-PUSCH-SubframeSet2-r12 and p0-NominalPUSCH-SubframeSet2-r12 respectively, provided by higher layers for serving cell c.

when j=2, $P_{O\_PUSCH,c}(2)=P_{O\_UE\_PUSCH,c}(2)+P_{O\_NOMINAL\_PUSCH,c}(2)$, $P_{O\_UE\_PUSCH,c}(2)=0$ and $P_{O\_NOMINAL\_PUSCH,c}(2)=P_{O\_PRE}+\Delta_{PREAMBLE\_Msg3}$, where the parameter preambleInitialReceivedTarget-Power ($P_{O\_PRE}$) and $\Delta_{PREAMBLE\_Msg3}$ are signalled from higher layers for serving cell c. Further, j=2 is used for PUSCH (re)transmissions corresponding to the random access response grant.

Otherwise, $P_{O\_PUSCH,c}(j)$ is a parameter composed of the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for serving cell c.

For PUSCH (re)transmissions corresponding to a semi-persistent grant then j=0, for PUSCH (re)transmissions corresponding to a dynamic scheduled grant then j=1 and for PUSCH (re)transmissions corresponding to the random access response grant then j=2. $P_{O\_UE\_PUSCH,c}(2)=0$ and $P_{O\_NOMINAL\_PUSCH,c}(2)=P_{O\_PRE}+\Delta_{PREAMBLE\_Msg3}$, where the parameter preambleInitialReceivedTargetPower ($P_{O\_PRE}$) and $\Delta_{PREAMBLE\_Msg3}$ are signalled from higher layers for serving cell c.

If the UE is configured with higher layer parameter UplinkPowerControlDedicated-v12x0 for serving cell c and if subframe i belongs to uplink power control subframe set 2 as indicated by the higher layer parameter tpc-Subframe-Set-r12, For j=0 or 1, $\alpha_c(j)=\alpha_{c,2}\in\{0, 0.4, 0.5, 0.6, 0.7, 0.8, 0.9, 1\}$. $\alpha_{c,2}$ is the parameter alpha-SubframeSet2-r12 provided by higher layers for each serving cell c.

For j=2, $\alpha_c(j)=1$

Else if the UE is configured with higher layer parameter UplinkPowerControlDedicated-v15x0 for serving cell c, For j=0 or 1, $\alpha_c(j)=\alpha_{c,UE}\in\{0, 0.4, 0.5, 0.6, 0.7, 0.8, 0.9, 1\}$. $\alpha_{c,UE}$ is the parameter alpha-UE-r15 provided by higher layers for each serving cell c.

For j=2, $\alpha_c(j)=1$.

Otherwise,

For j=0 or 1, $\alpha_c\in\{0, 0.4, 0.5, 0.6, 0.7, 0.8, 0.9, 1\}$ is a 3-bit parameter provided by higher layers for serving cell c. For j=2, $\alpha_c(j)=1$.

$PL_c$ is the downlink path loss estimate calculated in the UE for serving cell c in dB and $PL_c$=referenceSignalPower–higher layer filtered RSRP, where referenceSignalPower is provided by higher layers.

$\Delta_{TF,c}(i)=10\log_{10}((2^{BPRE\cdot K_s}-1)\cdot\beta_{offset}^{PUSCH})$ for $K_S$=1.25 and $\Delta_{TF,c}(i)=0$ for $K_S$=0 where $K_S$ is given by the parameter deltaMCS-Enabled provided by higher layers for each serving cell c. BPRE and $\beta_{offset}^{PUSCH}$, for each serving cell c, are computed as below. $K_S$=0 for transmission mode 2.

$\delta_{PUSCH,c}$ is a correction value, also referred to as a TPC command and is included in PDCCH/EPDCCH with DCI format 0/0A/0B/4/4A/4B or in PDCCH/SPDCCH with DCI format 7-0A/7-0B or in MPDCCH with DCI format 6-0A for serving cell c or jointly coded with other TPC commands in PDCCH/MPDCCH with DCI format 3/3A whose CRC parity bits are scrambled with TPC-PUSCH-RNTI.

If the UE is configured with higher layer parameter UplinkPowerControlDedicated-v12x0 for serving cell c and if subframe i belongs to uplink power control subframe set 2 as indicated by the higher layer parameter tpc-Subframe-Set-r12, the current PUSCH power control adjustment state for serving cell c is given by $f_{c,2}(i)$, and the UE shall use $f_{c,2}(i)$ instead of $f_{c,2}(i)$ to determine $P_{PUSCH,c}(i)$ Otherwise, the current PUSCH power control adjustment state for serving cell c is given by $f_c(i)$. If the UE is configured with multiple UL SPS configurations, $\delta_{PUSCH,c,x}$ is a correction value, also referred to as a TPC command and is jointly coded with other TPC commands in PDCCH with DCI format 3/3A whose CRC parity bits are scrambled with TPC-PUSCH-RNTI, where x is SPS-ConfigIndex-r14, and $f_{c,2}(i)$ and $f_2(i)$ are replaced by $f_{c,2,x}(i)$ and $f_{c,x}(i)$, respectively.

Physical Uplink Control Channel (PUCCH)

A PUCCH carries uplink control information, HARQ-ACK and/or scheduling request (SR) and is divided into a short PUCCH and a long PUCCH depending on a PUCCH transmission length. Table 6 below illustrates PUCCH formats.

TABLE 6

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 carries UCI with a maximum size of 2 bits, and is mapped and transmitted based on a sequence. Specifically, the UE transmit specific UCI to the base station by transmitting one sequence of a plurality of sequences on PUCCH of the PUCCH format 0. The UE transmits the PUCCH of the PUCCH format 0 within a PUCCH resource for a corresponding SR configuration only when transmitting a positive SR.

PUCCH format 1 carries UCI with a maximum size of 2 bits, and a modulation symbol is spread by an orthogonal cover code (OCC) (differently configured depending on whether frequency hopping is performed) in the time domain. DMRS is transmitted in a symbol in which the modulation symbol is not transmitted (i.e., DMRS is time division multiplexing (TDM) and transmitted).

PUCCH format 2 carries UCI with a bit size larger than 2 bits, and the modulation symbol is frequency division multiplexing (FDM) with the DMRS and transmitted. DMRS is located at symbol indexes #1, #4, #7 and #10 in a given resource block with a density of ⅓. A pseudo noise (PN) sequence is used for a DM_RS sequence. For 2-symbol PUCCH format 2, the frequency hopping may be activated.

PUCCH format 3 is not UE-multiplexed in the same physical resource blocks, and carries UCI with a bit size larger than 2 bits. In other words, the PUCCH resource of the PUCCH format 3 does not include a orthogonal cover code. The modulation symbol is TDMed with DMRS and transmitted.

PUCCH format 4 supports multiplexing up to 4 UEs in the same physical resource blocks, and carries UCI with a bit size larger than 2 bits. In other words, the PUCCH resource of the PUCCH format 3 includes the orthogonal cover code. The modulation symbol is TDMed with DMRS and transmitted.

FIG. 6 illustrates configuration in which a short PUCCH and a long PUCCH to which a method described in the present disclosure is applicable are multiplexed with an uplink signal.

PUCCH (e.g., PUCCH format 0/2) and PUSCH may be multiplexed in the TDM or FDM scheme. Short PUCCH and long PUCCH from different UEs may be multiplexed in the TDM or FDM scheme. Short PUCCHs from a single UE in one slot may be multiplexed in the TDM scheme. Short PUCCH and long PUCCH from a single UE in one slot may be multiplexed in the TDM or FDM scheme.

The contents described above can be combined and applied to methods described in the present disclosure to be described later, or can be supplemented to clarify technical features of the methods described in the present disclosure.

In the LTE or NR system, a UE may perform uplink transmission through a random access procedure without receiving scheduling for direct uplink transmission from a given base station (or cell).

From a UE perspective, the random access procedure includes random access preamble transmission, message 2 (Msg2) reception, message 3 (Msg3) transmission, and message 4 (Msg4) reception.

The message 2 (Msg2) is a message that the base station receiving a random preamble allocates uplink resources that the UE transmitting the corresponding preamble uses to transmit the message 3 (Msg3).

The UE transmits information such as a connection request together with its ID (IMSI, TIMSI, etc.) through the message 3 (Msg3).

The base station receiving the message 3 (Msg3) solves a random access collision that may occur between different UEs by transmitting an ID and necessary information of the corresponding UE through the message 4 (Msg4).

A 2-step random access channel (RACH) is considered where it reduces a processing delay of the procedure consisting of 4 steps as described above and can be used in a small cell or an unlicensed bandwidth.

In the case of 2-step RACH, the UE immediately transmits a message corresponding to the message 3 (Msg3) together with a random access preamble, and the base station responds to a message corresponding to the Msg2 and the Msg4 for this, thereby solving the collision.

In the present disclosure, for convenience of description, the random access preamble (Msg1) and the message 3 (Msg3) in the 2-step RACH are referred to as message A (MsgA), and the Msg2 and the Msg4 are referred to as message B (MsgB).

Each random access procedure may be limited to and referred to in 2-step or 4-step for the purpose of distinguishment, but this is merely for convenience of explanation and is not to limit the technical scope. Each random access procedure may be referred to in other ways. For example, the 4-step random access procedure may be referred to as a type-1 random access procedure, and the 2-step random access procedure may be referred to as a type-2 random access procedure.

In the 2-step RACH, preamble and data are transmitted together. If the base station fails to receive the preamble, the processing delay and power consumption increase due to the retransmission of PUSCH. Thus, the 2-step random access procedure may be more delayed than the 4-step random access procedure, or may be more inefficient than the 4-step random access procedure in terms of power.

In order to solve the above-described problem, the present disclosure looks at matters related to transmit power of the message A (MsgA). Methods to be described below are merely distinguished for convenience of explanation, and partial configuration of a method and partial configuration of other method can be substituted or combined with each other and applied.

Power control for preamble initial transmission in the message A (MsgA) is described in detail below.

In the NR system, power configuration related to preamble transmission of a UE is as follows.

A UE determines a transmission power for a physical random access channel (PRACH), $P_{PRACH,b,f,c}(i)$, on active UL BWP b of carrier f based on a current SS/PBCH block determination for serving cell c in a transmission occasion i as follows.

$$P_{PRACH,b,f,c}(i) = \min\{P_{CMAX,f,c}(i), P_{PRACH,target,f,c} + PL_{b,f,c}\}[dBm]$$

Where, $P_{CMAX,f,c}(i)$ is the configured UE transmission power defined in [8-1, TS 38.101-1] and [8-2, TS38.101-2] for carrier f of serving cell c within the transmission occasion i, and $P_{PRACH,target,f,c}$ is the PRACH preamble target reception power PREAMBLE_RECEIVED_TARGET_POWER provided by higher layers [11, TS 38.321] for the UL BWP b of carrier f of serving cell c. In addition, $PL_{b,f,c}$ is a path loss for the UL BWP b of carrier f for the current SS/PBCH block of serving cell c calculated by the UE in dB as referenceSignalPower—higher layer filtered RSRP, where RSRP is defined in [7, TS 38.215], and the higher layer filter configuration is defined in [12, TS 38.331].

If the PRACH transmission from the UE is not in response to a detection of a PDCCH order by the UE, or is in response to a detection of a PDCCH order by the UE that triggers a contention based random access procedure, referenceSignalPower is provided by ss-PBCH-BlockPower.

If the PRACH transmission from the UE is in response to a detection of a PDCCH order by the UE that triggers a non-contention based random access procedure and depending the DL RS that the DM-RS of the PDCCH order is quasi-collocated (QCLed) with, referenceSignalPower is provided by ss-PBCH-BlockPower or, when the UE is configured with resources for a periodic CSI-RS reception, referenceSignalPower is obtained by higher layer parameters ss-PBCH-BlockPower and powerControlOffsetSS, where powerControlOffsetSS provides an offset of CSI-RS transmission power relative to SS/PBCH block transmission power [6, TS 38.214]. If powerControlOffsetSS is not provided to the UE, the UE assumes an offset of 0 dB.

Matters related to preamble initial power of 2-step RACH message A (MsgA) are described below.

In the case of 4-step RACH, a UE configures initial transmission power for preamble transmission considering target received power designated by a base station and a path loss. That is, initial transmission power for preamble transmission is configured regardless of a RRC state of the UE.

However, the random access procedure may require low latency and reliability depending on the RRC state of the UE. In this regard, the following methods may be considered.

Methods to be described below are merely distinguished for convenience of explanation, and partial configuration of a method and partial configuration of other method can be substituted or combined with each other and applied.

Method 1

A method of configuring an initial preamble transmission power depending on a state of a UE may be considered.

Specifically, a preamble transmission power may be configured based on an event related to initiation of a random access procedure.

According to an embodiment, the event may include at least one of handover or beam failure recovery. In a RACH procedure in an emergency situation such as the handover or the beam failure recovery, an importance of preamble detection is higher than other states, and thus it is considered that there is a need to increase the probability of success of the preamble detection.

An offset value for the preamble transmission power may be differently configured depending on the state of the UE. The UE may determine the preamble transmission power with reference to a table including offset values mapped to 1:1 depending on the state of the UE. The UE may transmit a preamble based on the determined preamble transmission power.

For example, if a UE performs a RACH procedure for the handover or the beam failure recovery not a contention free procedure, the corresponding UE may determine, as the preamble transmission power, a value obtained by adding an offset value (e.g., 5 dB) depending on the corresponding RRC state to a target received power.

This embodiment can be applied to the 4-step random access procedure and the 2-step random access procedure.

Method 2

A method may be considered where a preamble transmission power of the 2-step random access procedure is set to be higher than a Msg1 transmission power of the 4-step random access procedure.

The power consumption upon retransmission in the 2-step RACH in which preamble and data are transmitted at once is greater than that in the 4-step RACH. Thus, by setting a preamble transmission power of MsgA to be higher than a transmission power of Msg1 of the 4-step RACH, the method can reduce the probability of retransmission of MsgA and can reduce resource required in the random access procedure.

That is, an offset value (DELTA_TWOSTEP) that is a value relative to the initial transmit power of the 4-step RACH procedure may be configured.

In relation to configuration of the preamble transmission power, whether or not a preamble received target power (P-RTP) needs to be separately configured for each of the 2-step RACH procedure and the 4-step RACH procedure is examined in detail below.

In case of RACH occasion (RO) sharing, different detection probability between the 2-step RACH procedure and the 4-step RACH procedure may be required. In this case, separated configuration of the preamble received target power (P-RTP) for the 2-step RACH procedure is required, and the gNBs can flexibly control their region based on the separated configuration. There is an opinion that the separated configuration of the preamble received target power (P-RTP) is necessary for the same reason as above.

When the RACH occasion is shared, if higher preamble received target power (P-RTP) is configured for UEs performing the 2-step RACH procedure, a performance of UEs performing the 4-step RACH procedure may be reduced. There is an opinion that the separated configuration of the preamble received target power (P-RTP) is not necessary for the same reason as above.

However, it doesn't matter anymore whether a network sets the same preamble received target power (P-RTP) value to the 2-step RACH procedure and the 4-step RACH procedure. In case of RO sharing, if UEs triggering the 2-step RACH can be located nearby the cell center so as to satisfy TA, an influence on the inter-cell is small even if the higher preamble received target power (P-RTP) is configured to the 2-step RACH procedure than the 4-step RACH procedure. In the case of separated RACH occasion, it does not matter even if high power is configured to the MsgA preamble.

Accordingly, the separated configuration of the preamble received target power (P-RTP) for the 2-step RACH procedure may be considered.

If setting an additional value within the entire range in relation to the separated configuration is a burden on the gNB, the introduction of offset may be considered. The transmission power for the MsgA preamble based on the offset can be expressed as in the following Equation 1.

$$P_{PRACH\_2step}=P_{PRACH,target,4-step}+\Delta_{PRACH,offset,2-step}+PL \quad \text{[Equation 1]}$$

Where, $P_{PRACH\_2step}$ is the preamble transmission power of the 2-step RACH procedure, $P_{PRACH,target,4-step}$ is the preamble received target power (P-RTP) of the 4-step RACH procedure, $\Delta_{PRACH,offset,2-step}$ is an offset related to preamble transmission of the 2-step RACH procedure, and PL is a path loss.

If the transmission power of the MsgA preamble is configured with a separate parameter not the offset, i.e., if the preamble received target power (P-RTP) is separately configured for the 2-step RACH procedure, the transmission power of the MsgA preamble may be expressed as in the following Equation 2.

$$P_{RACH\_2step}=P_{PRACH,target,2-step}+\Delta_{PRACH,offset,2-step}+PL \quad \text{[Equation 2]}$$

Where, $P_{PRACH\_2step}$ is the preamble transmission power of the 2-step RACH procedure, $P_{PRACH,target,2-step}$ is the preamble received target power (P-RTP) of the 2-step RACH procedure, $\Delta_{PRACH,offset,2-step}$ is the offset related to preamble transmission of the 2-step RACH procedure, and PL is a path loss.

If the preamble received target power (P-RTP) or the offset for the 2-step RACH procedure is not configured, the UE may determine the preamble transmission power of the MsgA based on the preamble received target power (P-RTP) for the 4-step RACH procedure.

Method 3

The following methods may be considered to configure the preamble transmission power of the 2-step RACH procedure to be higher than the preamble transmission power of the 4-step RACH procedure.

Method 3-1

In relation to the preamble transmission power of the 2-step RACH procedure, a method for a base station to configure a fixed value to a UE may be considered.

Specifically, the base station may directly indicate an offset value to the UE. For another example, the base station may transmit, to the UE, an index based on a pre-constructed offset value table via system information.

A UE performing the 2-step RACH procedure determines a preamble transmission power with reference to the offset value (or index) transmitted by the base station, and transmits a preamble based on the preamble transmission power.

A UE performing the 4-step RACH procedure ignores the offset value (or index) transmitted by the base station and determines a preamble transmission power.

Method 3-2

A method for configuring a preamble transmission power based on a data size transmitted via the MsgA may be considered.

Specifically, a power offset related to the preamble transmission may be differently configured depending on the data size transmitted via the MsgA. The data size transmitted via the MsgA may vary depending on a RRC state of a UE.

Retransmitting a lot of data may be burdensome in terms of power consumption, and thus the offset value may be added depending on PUSCH transmitted after the preamble. That is, the offset value may be based on the data size related to the PUSCH.

The base station may configure, to the UE, the offset value table mapped to the data size in 1:1. The UE may determine the preamble transmission power based on the offset depending on the data size. The offset value may be set as follows. The offset may be set to 0 dB if data is transmitted via 1RB to x RB, the offset may be net to 2 dB if data is transmitted via x+1 to y RB, and the offset may be set to 4 dB if data is transmitted via y+1 to z RB.

The UE may determine an initial power for the preamble transmission based on the preset values and the data size to be transmitted.

The application of offset value according to the above-described embodiments may be associated with a preamble index.

That is, preamble indexes (1, 2, . . . , Ncb) used in a contention based random access procedure may be divided into a plurality of groups. The number of plurality of groups may be the same as the number of offsets according to at least one embodiment of the above-described embodiments. Each of the plurality of groups may be mapped to the offset in 1:1.

For example, if the number of fixed values according to the method 3-1 is 5, the preamble indexes may be grouped into five groups. The preamble indexes may be equally distributed to the five groups. The UE may randomly select one of preamble indexes belonging to the group corresponding to the offset value and transmit the corresponding preamble. The last group may include all the remaining preamble indexes after the equal distribution.

Specifically, the number of remaining preamble indexes included in the last group may be expressed as follows.

$$N_{cb} - \left\lfloor \frac{Ncb}{\# \text{ of offset value}} \right\rfloor * \# \text{ of offset value}$$

Where, Ncb is the total number of preamble indexes for the contention based random access procedure, and # of offset value is the number of offset values. For example, it is assumed that Ncb=37 (e.g., preamble indexes 1 to 37), and the offset values are 1 dB, 2 dB and 3 dB, respectively. Since # of offset value is 3, the offset may be mapped to each of the 3 groups. For example, preamble indexes 1 to 12 may be included in a group mapped to offset 1 dB, preamble indexes 13 to 24 may be included in a group mapped to offset 2 dB, and preamble indexes 25 to 36 may be included in a group mapped to offset 3 dB. After the 12 preamble indexes are equally distributed to each of the three groups as above, the remaining preamble index 37 may be included in the group mapped to offset 3 dB.

For another example, the number of preamble indexes belonging to each group may also be differently set. If a random access procedure is initiated for handover or beam failure recovery, the random access procedure has a priority over other random access procedures, and thus a large number of preambles may be allocated. That is, in the case of the random access procedure initiated for handover or beam failure recovery, the number of preamble indexes included in a group mapped to the offset value may be greater than the number of preamble indexes included in other group among the plurality of groups.

The power control for data transmission in message A (MsgA) is described in detail below.

A method used to determine a transmission power of Msg3 in the 4-step random access procedure cannot be applied to data transmission of MsgA.

In the case of Msg3, the UE determines a PUSCH transmission power based on an additionally set value from the base station, in order to guarantee a transmission power when the latest preamble transmission has succeeded and reliability of PUSCH transmission. The PUSCH transmission power of Msg3 may be expressed as in the following Equation 3.

Msg3 Tx power=10*log 10(MPUSCH)+last preamble power+deltaPreambleMSG3+PC_msg2    [Equation 3]

In the above Equation 3, Msg3 Tx power is the PUSCH transmission power of Msg3, MPUSCH is the number of resource blocks allocated for transmission of Msg3, last preamble power is a preamble transmission power when the latest preamble transmission has succeeded, deltaPreambleMSG3 is an offset related to transmission of Msg3, and PC_msg2 is a power control factor (e.g., power control value depending on a path loss and a transport format) transferred via Msg2.

Data of MsgA may be similar to data of Msg3, but there is a need to separately configure a transmission power for transmission of MsgA PUSCH since a PUSCH of MsgA is consecutively transmitted after the preamble transmission.

The transmission power for transmission of MsgA PUSCH may be configured based on the following methods 4 and 5.

Method 4

A transmission power of MsgA PUSCH may be configured based on a preamble transmission power of Msg A.

A UE cannot receive a transmission power control (TPC) command from a base station after preamble transmission. Thus, the UE may determine the transmission power of MsgA PUSCH based on a preamble transmission power of contiguously transmitted preamble, and transmit the PUSCH based on the corresponding PUSCH transmission power. The transmission power of MsgA PUSCH may be expressed as in the following Equation 4.

MsgA PUSCH Tx power=10*log 10(MPUSCH)+
recent preamble power+PC (such as PL,TF)  [Equation 4]

In the above Equation 4, MsgA PUSCH Tx power is the PUSCH transmission power of MsgA, recent preamble power is a preamble received target power (P-RTP) for transmission of a preamble immediately before the transmission of PUSCH, MPUSCH is the number of resource blocks used in the PUSCH transmission of MsgA, and PC is a power control value depending on a path loss (PL) and a transport format (TF).

Method 5

A transmission power of MsgA PUSCH may be configured based on the recent preamble power and a relative offset value for the corresponding value.

Even if a base station succeeds in the detection of MsgA preamble, a UE shall retransmit all the preamble and data if the base station fails to decode a data message associated with the corresponding preamble.

Thus, an offset value for a preamble transmitted immediately before the transmission of MsgA PUSCH may be configured. The base station may transmit, to the UE, RACH configuration information including the offset value.

The transmission power of MsgA PUSCH configured in this case may be expressed as in the following Equation 5.

MsgA PUSCH Tx power=10*log 10(MPUSCH)+
recent preamble power+deltaPreambleMSGA+
PC(such as PL,TF)  [Equation 5]

In the above Equation 5, MsgA PUSCH Tx power is the PUSCH transmission power of MsgA, recent preamble power is a preamble received target power (P-RTP) for transmission of a preamble immediately before the transmission of PUSCH, deltaPreambleMSGA is an offset related to the preamble received target power (P-RTP), and PC is a power control value depending on a path loss (PL) and a transport format (TF).

The transmission power of msgA PUSCH, that is considered to be finally retransmitted, may be expressed as in the following Equation 6.

$$P_{PUSCH}(i) = \min(P_{CMAX}, [MsgA]preambleReceived\text{-}TargetPower + \Delta_{MsgA\_PUSCH} + 10 \log_{10}(2^\mu M_{RB}^{PUSCH}(i)) + \alpha PL(i) + \Delta_{TF}(i) + \Delta_{rampup}(i))$$ [Equation 6]

In Equation 6, $P_{CMAX}$ may be a pre-configured UE transmission power. For example, the pre-configured UE transmission power may be a maximum output power of the UE. [MsgA]preambleReceivedTargetPower is a preamble received target power (P-RTP) for transmission of a preamble. $2^\mu M_{RB}^{PUSCH}(i)$ is a bandwidth of PUSCH resource allocation expressed by the number of resource blocks for a PUSCH transmission occasion i, and μ is subcarrier spacing (SCS) configuration.

αPL(i) is a path loss compensation for the PUSCH transmission occasion i. $\Delta_{TF}(i)$ is a power control value related to a transport format for the PUSCH transmission occasion i.

$\Delta_{rampup}(i)$ is a power ramping component. According to an embodiment, $\Delta_{rampup}(i)$ may be expressed as in the following Equation 7.

$$\Delta_{rampup}(i) = \min\left[\left\{\max\left(0, P_{CMAX} - \begin{pmatrix} 10\log_{10}(2^\mu M_{RB}^{PUSCH}(i)) + \\ [MsgA]preambleReceivedTargetPower + \\ \Delta_{MsgA\_PUSCH} + \alpha PL(i) + \Delta_{TF}(i) \end{pmatrix}\right)\right\}, \Delta_{rampuprequested}\right]$$ [Equation 7]

In Equation 7, $\Delta_{rampuprequested}$ is a requested ramp up from higher layer. According to an embodiment, $\Delta_{rampuprequested}$ is a value equally applied to a preamble and a PUSCH of MsgA and may be expressed as in the following Equation 8.

$\Delta_{rampuprequested}$=(PREAMBLE_POWER_
RAMPING_COUNTER−1)×[MsgA]power-
RampingStep  [Equation 8]

In Equation 8, PREAMBLE_POWER_RAMPING_COUNTER is the number of preamble transmissions, and it is set to 1 upon initial preamble transmission and increases by 1 each time the preamble is retransmitted. [MsgA]powerRampingStep is a transmission power ramping step value. Upon the initial preamble transmission, $\Delta_{rampuprequested}$ will be zero, and hence $\Delta_{rampup}(i)$ will be zero.

From an implementation perspective, operations of a base station/UE according to the above-described embodiments (e.g., operations related to 2-step random access procedure) may be performed by devices of FIGS. 9 to 13 (e.g., processors 102 and 202 of FIG. 10) to be described later.

Further, operations of a base station/UE according to the above-described embodiments (e.g., operations related to 2-step random access procedure) may be stored in a memory (e.g., 104 and 204 illustrated in FIG. 10) in the form of command/program (e.g., instruction, executable code) for executing at least one processor (e.g., 102 and 202 illustrated in FIG. 10).

The above-described embodiments are described in detail below with reference to FIG. 7 from a UE operation perspective. Methods to be described below are merely distinguished for convenience of explanation, and partial configuration of a method and partial configuration of other method can be substituted or combined with each other and applied.

FIG. 7 is a flow chart illustrating a method for a UE to perform a random access procedure in a wireless communication system according to an embodiment of the present disclosure.

Referring to FIG. 7, a method for a UE to perform a random access procedure in a wireless communication system according to an embodiment of the present disclosure comprises a step S710 of receiving random access procedure configuration information, a step S720 of transmitting a random access preamble and a physical uplink shared channel (PUSCH), and a step S730 of receiving a random access response message.

In the step S710, the UE receives, from a base station, configuration information related to a random access procedure. The configuration information may be configuration information related to a 2-step random access procedure (or type-2 random access procedure).

According to an embodiment, the configuration information may include information related to a transmission power of a message A (MsgA). For example, the configuration information may include preamble reception power information to be described below.

According to the step S710, an operation for the UE (100/200 illustrated in FIGS. 9 to 13) to receive, from the base station (100/200 illustrated in FIGS. 9 to 13), the configuration information related to the random access procedure may be implemented by devices of FIGS. 9 to 13. For example, referring to FIG. 10, at least one processor 102 may control at least one transceiver 106 and/or at least one memory 104, so as to receive, from the base station 200, the configuration information related to the random access procedure.

In the step S720, the UE transmits, to the base station, the random access preamble and the physical uplink shared channel (PUSCH). The random access preamble may be a random access preamble of the message A (MsgA). The PUSCH may be a PUSCH of the message A (MsgA).

According to an embodiment, the PUSCH may be transmitted based on a predetermined PUSCH transmission power. The predetermined PUSCH transmission power may be based on preamble reception power information related to a transmission of the random access preamble and a specific offset. The predetermined PUSCH transmission power may be the PUSCH transmission power of the MsgA according to the method 4 and the method 5 described above. The preamble reception power information may include a preamble received target power (P-RTP).

According to an embodiment, the specific offset may be related to the preamble reception power information. The specific offset may be deltaPreambleMSGA according to the method 5.

According to an embodiment, the predetermined PUSCH transmission power may be determined as the smaller value of:
  i) a pre-configured UE transmission power; and
  ii) a value calculated based on the preamble reception power information and the specific offset.

The predetermined PUSCH transmission power may be $P_{PUSCH}(i)$ based on the above Equation 6. The pre-configured UE transmission power may be $P_{CMAX}$ of the above Equation 6. $P_{CMAX}$ may be a maximum output power of the UE.

According to an embodiment, the random access preamble may be transmitted based on the predetermined preamble transmission power. The predetermined preamble transmission power may be based on i) the preamble reception power information and ii) an offset for the preamble transmission power. The predetermined preamble transmission power may be a preamble transmission power according to the methods 1 to 3 described above.

According to an embodiment, the offset for the preamble transmission power may be based on a data size related to the PUSCH.

According to an embodiment, the offset for the preamble transmission power may be based on an event related to an initiation of the random access procedure. The event may include at least one of a handover or a beam failure recovery.

According to an embodiment, the offset for the preamble transmission power may be related to an index of the random access preamble. Specifically, the offset for the preamble transmission power may be mapped to one group of a plurality of groups to which all the preamble indexes belong. The index of the random access preamble may be one of a plurality of preamble indexes mapped to the offset for the preamble transmission power.

According to the step S720, an operation for the UE (100/200 illustrated in FIGS. 9 to 13) to transmit, to the base station (100/200 illustrated in FIGS. 9 to 13), the random access preamble and the physical uplink shared channel (PUSCH) may be implemented by devices of FIGS. 9 to 13. For example, referring to FIG. 10, at least one processor 102 may control at least one transceiver 106 and/or at least one memory 104, so as to transmit, to the base station 200, the random access preamble and the PUSCH.

In the step S730, the UE receives the random access response (RAR) message from the base station. The RAR message may be a message B (MsgB) of the 2-step random access procedure (or type-2 random access procedure).

According to the step S730, an operation for the UE (100/200 illustrated in FIGS. 9 to 13) to receive the random access response (RAR) message from the base station (100/200 illustrated in FIGS. 9 to 13) may be implemented by devices of FIGS. 9 to 13. For example, referring to FIG. 10, at least one processor 102 may control at least one transceiver 106 and/or at least one memory 104, so as to receive the RAR message from the base station 200.

The above-described embodiments are described in detail below with reference to FIG. 8 from an operation perspective of a base station. Methods to be described below are merely distinguished for convenience of explanation, and partial configuration of a method and partial configuration of other method can be substituted or combined with each other and applied.

FIG. 8 is a flow chart illustrating a method for a base station to perform a random access procedure in a wireless communication system according to another embodiment of the present disclosure.

Referring to FIG. 8, a method for a base station to perform a random access procedure in a wireless communication system according to an embodiment of the present disclosure comprises a step S810 of transmitting random access procedure configuration information, a step S820 of receiving a random access preamble and a physical uplink shared channel (PUSCH), and a step S830 of transmitting a random access response message.

In the step S810, the base station transmits, to the UE, configuration information related to a random access procedure. The configuration information may be configuration information related to a 2-step random access procedure (or type-2 random access procedure).

According to an embodiment, the configuration information may include information related to a transmission power of a message A (MsgA). For example, the configuration information may include preamble reception power information to be described below.

According to the step S810, an operation for the base station (100/200 illustrated in FIGS. 9 to 13) to transmit, to the UE (100/200 illustrated in FIGS. 9 to 13), the configuration information related to the random access procedure may be implemented by devices of FIGS. 9 to 13. For example, referring to FIG. 10, at least one processor 202 may control at least one transceiver 206 and/or at least one memory 204, so as to transmit, to the UE 100, the configuration information related to the random access procedure.

In the step S820, the base station receives, from the UE, the random access preamble and the physical uplink shared channel (PUSCH). The random access preamble may be a random access preamble of the message A (MsgA). The PUSCH may be a PUSCH of the message A (MsgA).

According to an embodiment, the PUSCH may be transmitted based on a predetermined PUSCH transmission power. The predetermined PUSCH transmission power may be based on preamble reception power information related to a transmission of the random access preamble and a specific offset. The predetermined PUSCH transmission power may be the PUSCH transmission power of the MsgA according to the method 4 and the method 5 described above. The preamble reception power information may include a preamble received target power (P-RTP).

According to an embodiment, the specific offset may be related to the preamble reception power information. The specific offset may be deltaPreambleMSGA according to the method 5.

According to an embodiment, the predetermined PUSCH transmission power may be determined as the smaller value of:

i) a pre-configured UE transmission power; and
ii) a value calculated based on the preamble reception power information and the specific offset.

The predetermined PUSCH transmission power may be $P_{PUSCH}(i)$ based on the above Equation 6. The pre-configured UE transmission power may be $P_{CMAX}$ of the above Equation 6. $P_{CMAX}$ may be a maximum output power of the UE.

According to an embodiment, the random access preamble may be transmitted based on the predetermined preamble transmission power. The predetermined preamble transmission power may be based on i) the preamble reception power information and ii) an offset for the preamble transmission power. The predetermined preamble transmission power may be a preamble transmission power according to the methods 1 to 3 described above.

According to an embodiment, the offset for the preamble transmission power may be based on a data size related to the PUSCH.

According to an embodiment, the offset for the preamble transmission power may be based on an event related to an initiation of the random access procedure. The event may include at least one of a handover or a beam failure recovery.

According to an embodiment, the offset for the preamble transmission power may be related to an index of the random access preamble. Specifically, the offset for the preamble transmission power may be mapped to one group of a plurality of groups related to all the preamble indexes. Each group may include one or more preamble indexes. Thus, the index of the random access preamble may be one of a plurality of preamble indexes mapped to the offset for the preamble transmission power.

According to the step S820, an operation for the base station (100/200 illustrated in FIGS. 9 to 13) to receive, from the UE (100/200 illustrated in FIGS. 9 to 13), the random access preamble and the physical uplink shared channel (PUSCH) may be implemented by devices of FIGS. 9 to 13. For example, referring to FIG. 10, at least one processor 202 may control at least one transceiver 206 and/or at least one memory 204, so as to receive, from the UE 100, the random access preamble and the PUSCH.

In the step S830, the base station transmits the random access response (RAR) message to the UE. The RAR message may be a message B (MsgB) of the 2-step random access procedure (or type-2 random access procedure).

According to the step S830, an operation for the base station (100/200 illustrated in FIGS. 9 to 13) to transmit the random access response (RAR) message to the UE (100/200 illustrated in FIGS. 9 to 13) may be implemented by devices of FIGS. 9 to 13. For example, referring to FIG. 10, at least one processor 202 may control at least one transceiver 206 and/or at least one memory 204, so as to transmit the RAR message to the UE 100.

Example of wireless communication system applied to the present disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 9 illustrates a communication system 1 applied to the present disclosure.

Referring to FIG. 9, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure

FIG. 10 illustrates wireless devices applicable to the present disclosure.

Referring to FIG. 10, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 9.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio. Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

FIG. 11 illustrates a signal process circuit for a transmission signal.

Referring to FIG. 11, a signal processing circuit 1000 may include scramblers 1010, modulators 1020, a layer mapper 1030, a precoder 1040, resource mappers 1050, and signal generators 1060. An operation/function of FIG. 11 may be performed, without being limited to, the processors 102 and 202 and/or the transceivers 106 and 206 of FIG. 10. Hardware elements of FIG. 11 may be implemented by the processors 102 and 202 and/or the transceivers 106 and 206 of FIG. 10. For example, blocks 1010 to 1060 may be implemented by the processors 102 and 202 of FIG. 10. Alternatively, the blocks 1010 to 1050 may be implemented by the processors 102 and 202 of FIG. 10 and the block 1060 may be implemented by the transceivers 106 and 206 of FIG. 10.

Codewords may be converted into radio signals via the signal processing circuit 1000 of FIG. 11. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 11. For example, the wireless devices (e.g., 100 and 200 of FIG. 10) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 12 illustrates another example of a wireless device applied to the present disclosure.

The wireless device may be implemented in various forms according to a use-case/service (refer to FIG. 9). Referring to FIG. 12, wireless devices 100 and 200 may correspond to the wireless devices 100 and 200 of FIG. 10 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 10. For example, the transceiver(s) 114 may include the one or more transceivers 106 and 206 and/or the one or more antennas 108 and 208 of FIG. 10. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 9), the vehicles (100b-1 and 100b-2 of FIG. 9), the XR device (100c of FIG. 9), the hand-held device (100d of FIG. 9), the home appliance (100e of FIG. 9), the IoT device (100f of FIG. 9), a digital broadcast terminal, a hologram device, a public safety device, an MTC device, a medicine device, a fintech device (or a finance device), a security device, a climate/environment device, the AI server/device (400 of FIG. 9), the BSs (200 of FIG. 9), a network node, etc. The wireless device may be used in a mobile or fixed place according to a use-example/service.

In FIG. 12, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 13 illustrates a hand-held device applied to the present disclosure.

The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 13, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 12, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Effects of a method and device for performing a random access procedure in a wireless communication system according to an embodiment of the present disclosure are described as follows.

According to an embodiment of the present disclosure, in a 2-step random access procedure, a UE transmits a PUSCH based on a predetermined PUSCH transmission power. The predetermined PUSCH transmission power is based on preamble reception power information and a specific offset related to transmission of a random access preamble. Thus, the decoding of the random access preamble has been completed, but the probability of retransmission of the preamble and the PUSCH caused by a failure of the decoding of the PUSCH is reduced, and resources required in the random access procedure are reduced.

According to an embodiment of the present disclosure, a random access preamble is transmitted based on higher power than Msg1 of a 4-step RACH. Specifically, the random access preamble is transmitted based on a predetermined preamble transmission power. The preamble transmission power is based on i) preamble reception power information and ii) an offset for the preamble transmission power.

As described above, a random access preamble of message A (MsgA) may be transmitted based on high power than Msg1 of a 4-step random access procedure. In other words, since a decoding failure of the random access preamble causes the retransmission of the PUSCH, the 2-step random access procedure may be performed to have a priority over the 4-step random access procedure.

According to an embodiment of the present disclosure, the offset for the preamble transmission power is based on a data size related to the PUSCH or an event related to an initiation of the random access procedure. Thus, the corresponding random access procedure may be performed depending on an importance or an urgency of the random access procedure. Specifically, the random access procedure initiated for handover or beam failure recovery or the random access procedure when a size of data to be transmitted is large may be performed to have a priority over a 2-step random access procedure of another UE.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method performed by a user equipment (UE) in a wireless communication system, the method comprising:
receiving i) a Preamble Received Target Power for a preamble related to a 4-step Random Access (RA) type and ii) a msg3 Delta Preamble for a transmission of a Msg3 Physical Uplink Shared CHannel (PUSCH) related to the 4-step RA type;
receiving i) a msgA Preamble Received Target Power for a MsgA preamble related to a 2-step RA type and ii) a msgA Delta Preamble for a transmission of a MsgA PUSCH related to the 2-step RA type;
based on a random access procedure related to the 2-step RA type being initiated, transmitting the MsgA preamble and the MsgA PUSCH; and
receiving a random access response (RAR) message,
wherein the MsgA preamble is transmitted based on the msgA Preamble Received Target Power,
wherein the MsgA PUSCH is transmitted based on a PUSCH transmission power, and
wherein the PUSCH transmission power is determined based on i) a number of resource blocks for the transmission of the MsgA PUSCH, ii) the msgA Preamble Received Target Power, iii) the msgA Delta Preamble which is a power offset relative to the msgA Preamble Received Target Power, iv) a power control value related to a path loss (PL), and v) a power control value related to a transport format (TF).

2. The method of claim 1, wherein the PUSCH transmission power is determined as a smaller value of:
  i) a pre-configured UE transmission power; and
  ii) a value calculated based on i) the number of resource blocks for the transmission of the MsgA PUSCH, ii) the msgA Preamble Received Target Power, iii) the msgA Delta Preamble, iv) the power control value related to the PL, and v) the power control value related to the TF.

3. A user equipment (UE) configured to operate in a wireless communication system, the UE comprising:
  one or more transceivers;
  one or more processors; and
  one or more memories operationally connected to the one or more processors and storing instructions that, based on being executed by the one or more processors, perform operations comprising:
  receiving i) a Preamble Received Target Power for a preamble related to a 4-step Random Access (RA) type and ii) a msg3 Delta Preamble for a transmission of a Msg3 Physical Uplink Shared CHannel (PUSCH) related to the 4-step RA type;
  receiving i) a msgA Preamble Received Target Power for a MsgA preamble related to a 2-step RA type and ii) a msgA Delta Preamble for a transmission of a MsgA PUSCH related to the 2-step RA type;
  based on a random access procedure related to the 2-step RA type being initiated, transmitting the MsgA preamble and the MsgA PUSCH; and
  receiving a random access response (RAR) message,
  wherein the MsgA preamble is transmitted based on the msgA Preamble Received Target Power,
  wherein the MsgA PUSCH is transmitted based on a PUSCH transmission power, and
  wherein the PUSCH transmission power is determined based on i) a number of resource blocks for the transmission of the MsgA PUSCH, ii) the msgA Preamble Received Target Power, iii) the msgA Delta Preamble which is a power offset relative to the msgA Preamble Received Target Power, iv) a power control value related to a path loss (PL), and v) a power control value related to a transport format (TF).

4. A method performed by a base station in a wireless communication system, the method comprising:
  transmitting i) a Preamble Received Target Power for a preamble related to a 4-step Random Access (RA) type and ii) a msg3 Delta Preamble for a transmission of a Msg3 Physical Uplink Shared CHannel (PUSCH) related to the 4-step RA type;
  transmitting i) a msgA Preamble Received Target Power for a MsgA preamble related to a 2-step RA type and ii) a msgA Delta Preamble for a transmission of a MsgA PUSCH related to the 2-step RA type;
  based on a random access procedure related to the 2-step RA type being initiated, receiving the MsgA preamble and the MsgA PUSCH; and
  transmitting a random access response (RAR) message,
  wherein the MsgA preamble is transmitted, by a user equipment (UE), based on the msgA Preamble Received Target Power,
  wherein the MsgA PUSCH is transmitted, by the UE, based on a PUSCH transmission power, and
  wherein the PUSCH transmission power is determined based on i) a number of resource blocks for the transmission of the MsgA PUSCH, ii) the msgA Preamble Received Target Power, iii) the msgA Delta Preamble which is a power offset relative to the msgA Preamble Received Target Power, iv) a power control value related to a path loss (PL), and v) a power control value related to a transport format (TF).

* * * * *